(12) United States Patent
Rosenzweig et al.

(10) Patent No.: US 7,481,858 B2
(45) Date of Patent: Jan. 27, 2009

(54) HYDROGEN GENERATING FUEL CELL CARTRIDGES

(75) Inventors: Alain Rosenzweig, Saint Maur des Fossés (FR); Paul Adams, Monroe, CT (US); Andrew J. Curello, Hamden, CT (US); Floyd Fairbanks, Naugatuck, CT (US); Anthony Sgroi, Jr., Wallingford, CT (US); Constance R. Stephan, Oxford, CT (US)

(73) Assignee: Societe BIC (FR)

( * ) Notice: Subject to any disclaimer, the term of this patent is extended or adjusted under 35 U.S.C. 154(b) by 563 days.

(21) Appl. No.: 11/067,167

(22) Filed: Feb. 25, 2005

(65) Prior Publication Data
US 2006/0191199 A1    Aug. 31, 2006

(51) Int. Cl.
C10J 3/68 (2006.01)
C10J 3/20 (2006.01)
B01J 7/00 (2006.01)

(52) U.S. Cl. .................. 48/76; 48/118.5; 48/120; 48/174; 48/127.9; 48/62 R; 48/128; 48/198.2; 48/61; 48/197 R

(58) Field of Classification Search .......... 48/76, 48/118.5, 120, 174, 127.9, 62 R, 128, 198.2, 48/61, 197 R; 422/162, 211, 234, 236, 238, 422/240, 129, 212, 255, 305
See application file for complete search history.

(56) References Cited

U.S. PATENT DOCUMENTS

| 2,463,863 | A | | 3/1949 | Gibadlo |
|---|---|---|---|---|
| 3,174,833 | A | | 3/1965 | Blackmer |
| 3,607,066 | A | | 9/1971 | Basch et al. |
| 3,649,360 | A | | 3/1972 | Bloomfield et. al. |
| 4,000,003 | A | | 12/1976 | Baker et al. |
| 4,122,718 | A | * | 10/1978 | Gustafson ............ 73/304 C |
| 4,123,987 | A | | 11/1978 | Singerle et al. |
| 4,261,955 | A | | 4/1981 | Bailey, Jr. et al. |
| 4,261,956 | A | | 4/1981 | Adlhart |
| 4,265,720 | A | | 5/1981 | Winstel |
| 4,317,046 | A | * | 2/1982 | Holmberg ............ 290/1 R |
| 4,431,561 | A | | 2/1984 | Ovshinsky et al. |

(Continued)

FOREIGN PATENT DOCUMENTS

EP    1375419 A2    1/2004

(Continued)

OTHER PUBLICATIONS

International Search Report and Written Opinion for PCT/US06/06182 mailed on Aug. 1, 2007.

*Primary Examiner*—Walter D Griffin
*Assistant Examiner*—Huy-Tram Nguyen
(74) *Attorney, Agent, or Firm*—The H.T. Than Law Group

(57) ABSTRACT

A gas-generating apparatus includes a reaction chamber having a first reactant, a reservoir having an optional second reactant, and a self-regulated flow control device. The self-regulated flow control device stops the flow of reactant from the reservoir to the reaction chamber when the pressure of the reaction chamber reaches a predetermined level. Methods of operating the gas-generated apparatus and the self-regulated flow control device, including the cycling of a shut-off valve of the gas-generated apparatus and the cycling of the self-regulated flow control device are also described.

46 Claims, 10 Drawing Sheets

U.S. PATENT DOCUMENTS

| | | | |
|---|---|---|---|
| 4,513,065 A | 4/1985 | Adlhart | |
| 4,713,234 A | 12/1987 | Weirich et al. | |
| 5,759,712 A | 6/1998 | Hockaday | |
| 5,823,478 A * | 10/1998 | Dunn | 244/171.1 |
| 5,906,446 A | 5/1999 | McCulloch et al. | |
| 5,958,091 A | 9/1999 | Sakai et al. | |
| 5,997,821 A * | 12/1999 | Joshi | 422/129 |
| 6,274,093 B1 * | 8/2001 | Long et al. | 422/129 |
| 6,303,009 B1 * | 10/2001 | Bossard | 204/228.4 |
| 6,326,097 B1 | 12/2001 | Hockaday | |
| 6,391,818 B1 | 5/2002 | Bönsel et al. | |
| 6,534,033 B1 | 3/2003 | Amendola et al. | |
| 6,544,400 B2 * | 4/2003 | Hockaday et al. | 205/338 |
| 6,613,471 B2 | 9/2003 | Ovshinsky et al. | |
| 6,630,266 B2 | 10/2003 | Hockaday et al. | |
| 6,645,651 B2 | 11/2003 | Hockaday et al. | |
| 6,683,025 B2 | 1/2004 | Amendola et al. | |
| 6,727,012 B2 | 4/2004 | Chen et al. | |
| 6,737,184 B2 | 5/2004 | Rusta-Sellehy et al. | |
| 6,745,801 B1 | 6/2004 | Cohen et al. | |
| 6,746,496 B1 * | 6/2004 | Kravitz et al. | 48/118.5 |
| 6,758,981 B2 | 7/2004 | Mazza et al. | |
| 6,770,186 B2 | 8/2004 | Rosenfeld et al. | |
| 6,773,470 B2 | 8/2004 | Finkelshtain et al. | |
| 6,790,416 B2 | 9/2004 | Mann et al. | |
| 6,797,667 B2 | 9/2004 | Ruth et al. | |
| 6,818,334 B2 | 11/2004 | Tsang | |
| 6,821,499 B2 | 11/2004 | Jorgensen | |
| 6,828,049 B2 | 12/2004 | Bullock et al. | |
| 6,932,847 B2 * | 8/2005 | Amendola et al. | 48/76 |
| 2002/0088178 A1 | 7/2002 | Davis | |
| 2003/0194369 A1 | 10/2003 | Prasad et al. | |
| 2004/0048115 A1 | 3/2004 | Devos | |
| 2004/0067195 A1 | 4/2004 | Strizki et al. | |
| 2004/0120889 A1 | 6/2004 | Shah et al. | |
| 2004/0148857 A1 * | 8/2004 | Strizki et al. | 48/127.9 |
| 2004/0202903 A1 | 10/2004 | de Vos et al. | |
| 2004/0205997 A1 * | 10/2004 | Youngblood | 48/197 R |

FOREIGN PATENT DOCUMENTS

| | | |
|---|---|---|
| EP | 1396 472 A2 | 3/2004 |

* cited by examiner

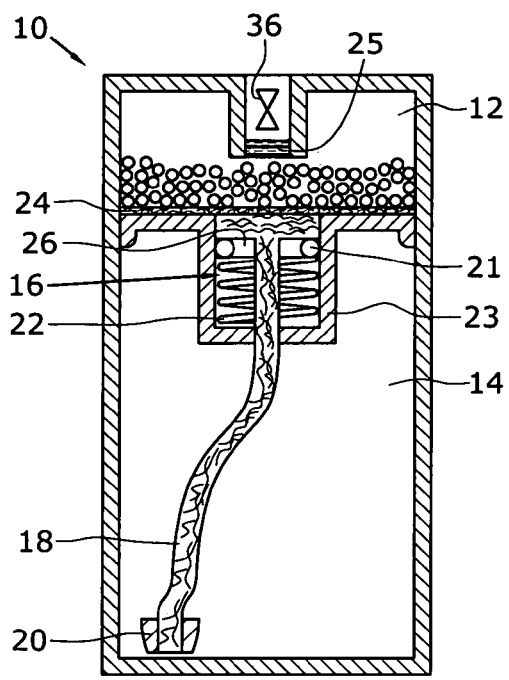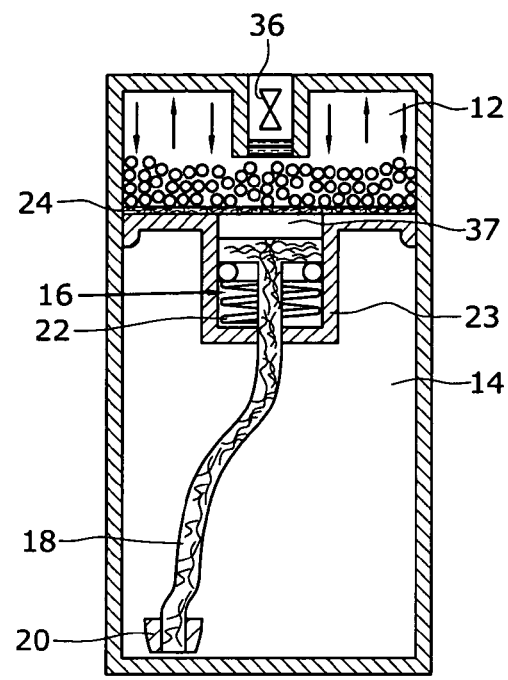
Fig. 1(a)　　　　　Fig. 1(b)
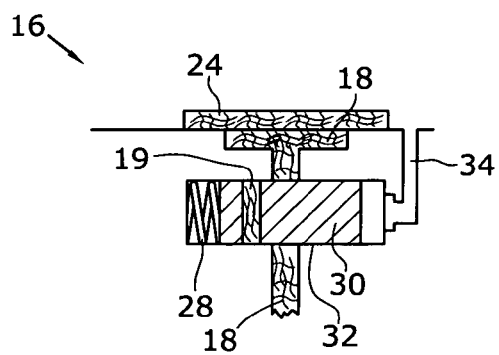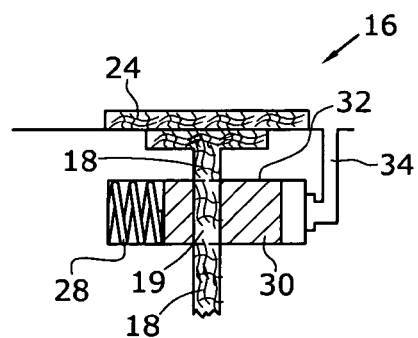
Fig. 1(c)　　　　　Fig. 1(d)

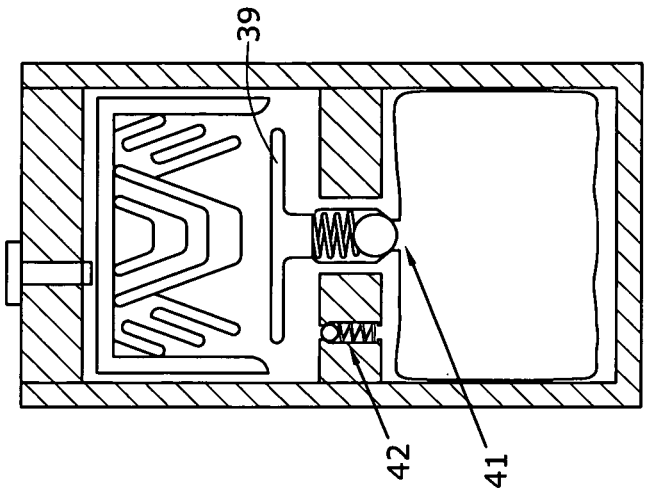
Fig. 2(a)
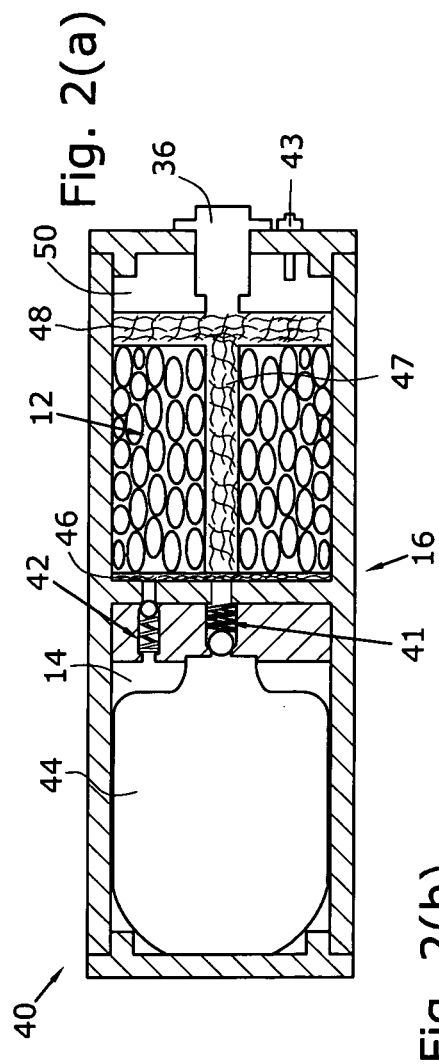
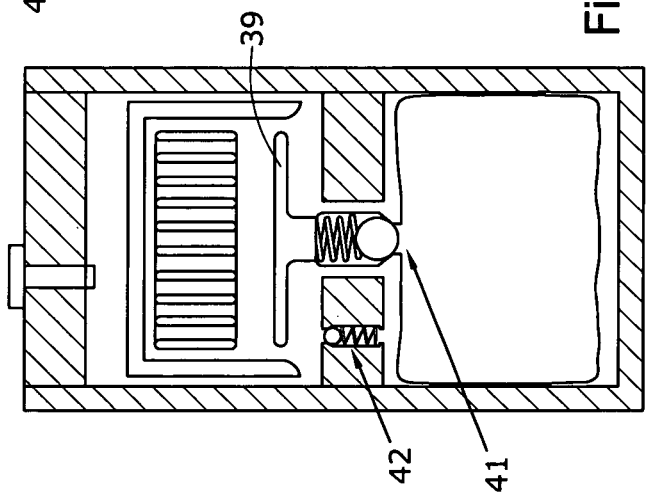
Fig. 2(b)
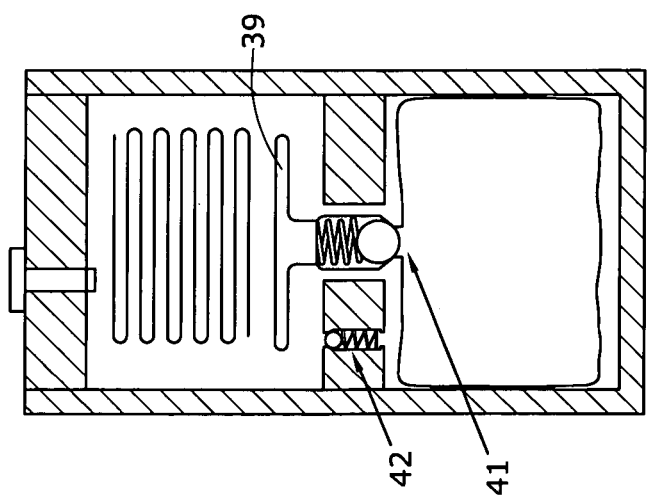
Fig. 2(c)
Fig. 2(d)

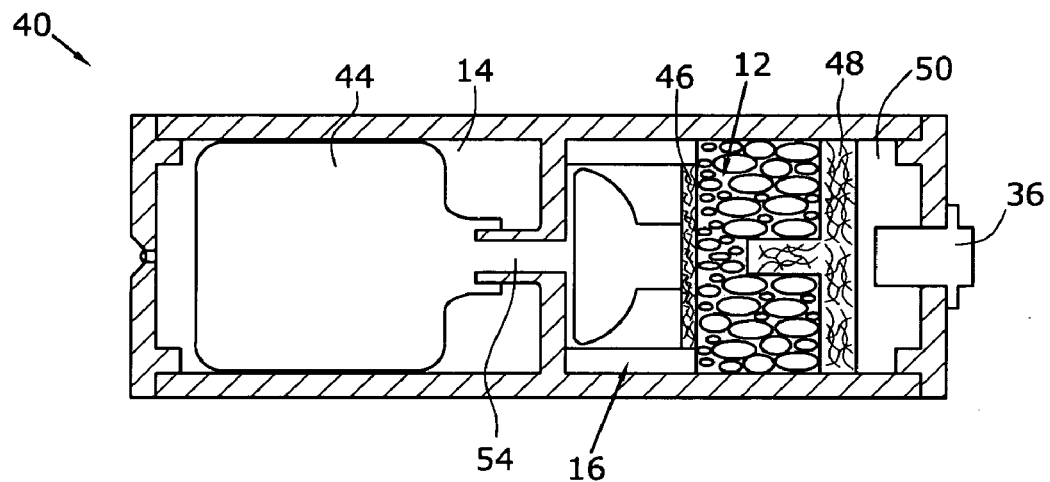
Fig. 4(a)
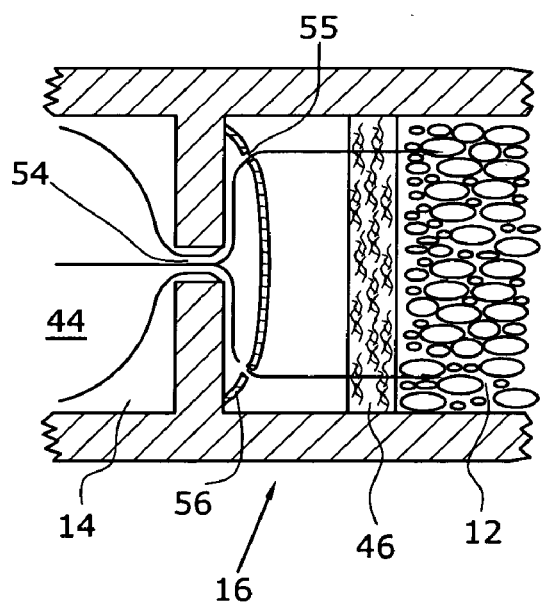
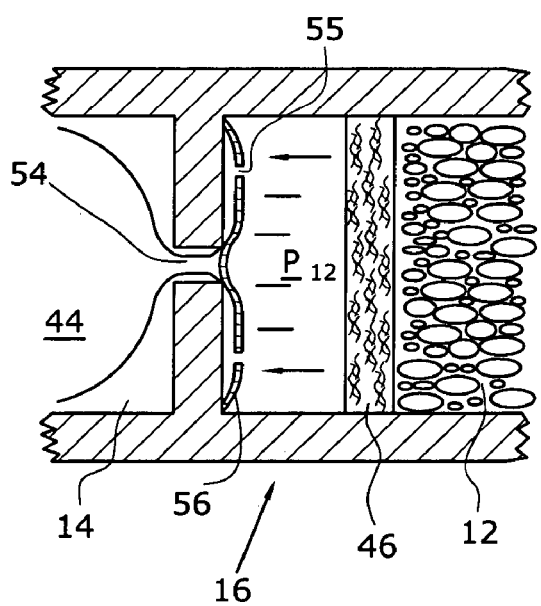
Fig. 4(b)                Fig. 4(c)

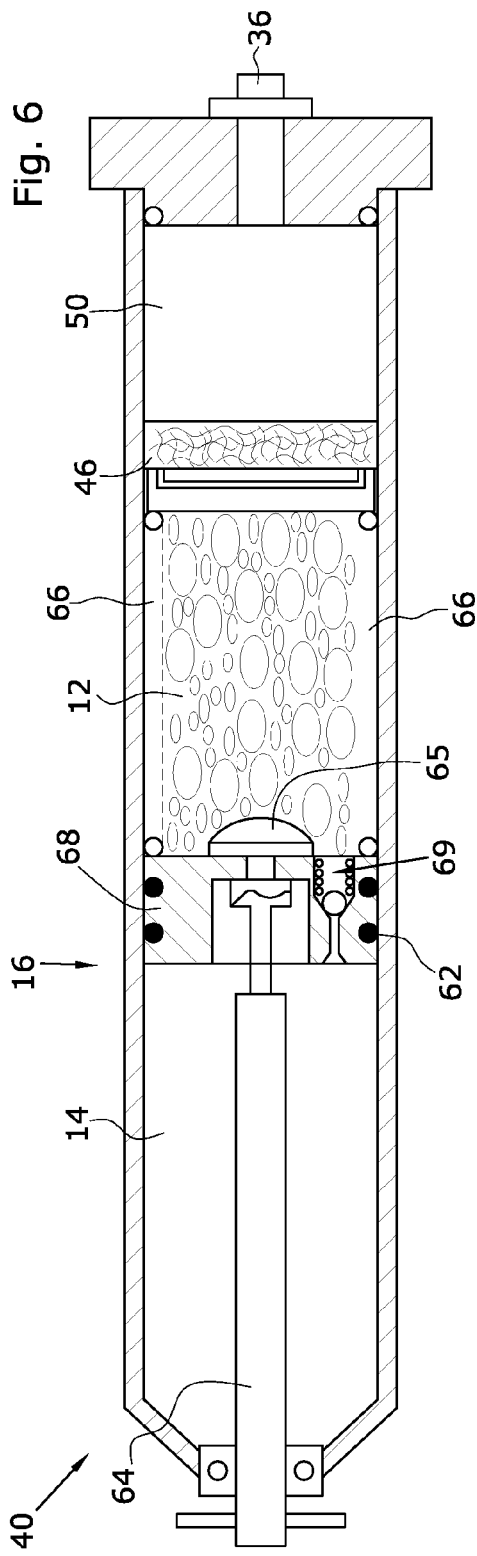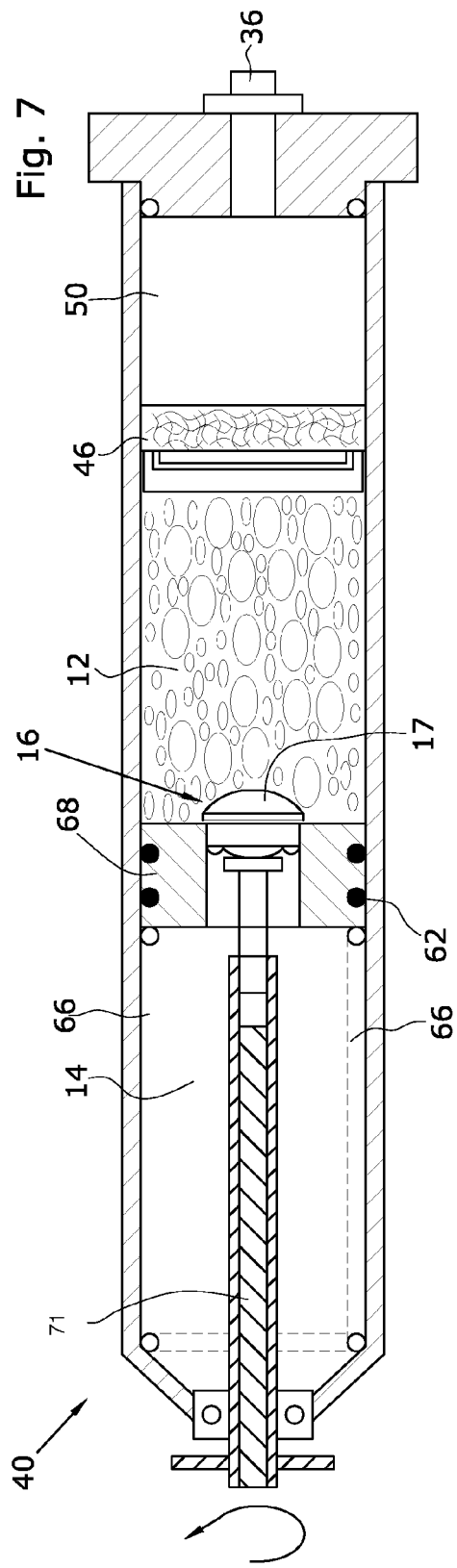

HYDROGEN GENERATING FUEL CELL CARTRIDGES

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell and also has promising power application for consumer electronic devices. SOFC convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-reaction at the anode:

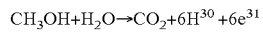

Half-reaction at the cathode:

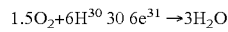

The overall fuel cell reaction:

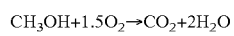

Due to the migration of the hydrogen ions ($H^{3O}$) through the PEM from the anode to the cathode and due to the inability of the free electrons ($e^{31}$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated herein by reference in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

In another direct oxidation fuel cell, borohydride fuel cell (DBFC) reacts as follows:

Half-reaction at the anode:

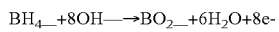

Half-reaction at the cathode:

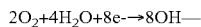

In a chemical metal hydride fuel cell, aqueous sodium borohydride is reformed and reacts as follows:

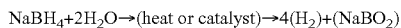

Half-reaction at the anode:

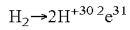

Half-reaction at the cathode:

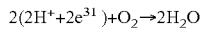

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated herein by reference in its entirety.

One of the most important features for fuel cell application is fuel storage. Another important feature is to regulate the transport of fuel out of the fuel cartridge to the fuel cell. To be commercially useful, fuel cells such as DMFC or PEM systems should have the capability of storing sufficient fuel to satisfy the consumers' normal usage. For example, for mobile or cell phones, for notebook computers, and for personal digital assistants (PDAs), fuel cells need to power these devices for at least as long as the current batteries and, preferably, much longer. Additionally, the fuel cells should have easily replaceable or refillable fuel tanks to minimize or obviate the need for lengthy recharges required by today's rechargeable batteries.

One disadvantage of the known hydrogen gas generators is that once the reaction starts the gas generator cartridge cannot control the reaction. Thus, the reaction will continue until the supply of the reactants run out or the source of the reactant is manually shut down.

Accordingly, there is a desire to obtain a hydrogen gas generator apparatus that is capable of self-regulating the flow of at least one reactant into the reaction chamber.

SUMMARY OF THE INVENTION

The present invention is directed to fuel systems/gas-generating apparatus that have significantly longer shelf life and are more efficient in producing hydrogen.

In one embodiment, the present invention relates to a gas-generating apparatus that includes at least a reaction chamber, a reservoir and a self-regulated flow control device or system. The self-regulated flow control device/system stops the transport of the reactant from the reservoir to the reaction chamber when the pressure inside the reaction chamber reaches a predetermined pressure.

In another embodiment, the gas-generating apparatus of the present invention includes a reaction chamber and a reservoir containing at least one reactant. The reactant is transported from the reservoir to the reaction chamber to generate hydrogen gas. Generally, when the pressure in the reaction chamber exceeds a predetermined pressure, the apparatus switches from an operative state to a non-operative state, and when the pressure drops below the predetermined pressure, the apparatus switches from a non-operative state to an operative state.

Preferably, the reaction chamber contains another reactant or a catalyst, or is heated to promote the production of hydrogen gas. The reactant from the reservoir can be transported by capillary action or by a pump. The reservoir may also be pressurized by different methods to transport the reactant from the reservoir to the reaction chamber. Alternatively, the pressure created by the reforming reaction in the reaction chamber can be communicated back to the reservoir to transport the reactant to the reaction chamber.

The self-regulated flow control device can be a pressure sensitive diaphragm, a check valve, a piston or pusher, a means to discontinue the capillary flow path, among others, or combinations thereof.

Methods of operating the gas-generated apparatus and the self-regulated flow control device, including the cycling of a shut-off valve of the gas-generated apparatus and the cycling of the self-regulated flow control device are also provided.

It is to be understood that both the foregoing general description and the following detailed description are exemplary and explanatory only and are intended to provide a further explanation of the present invention, as claimed.

BRIEF DESCRIPTION OF THE DRAWINGS

In the accompanying drawings, which form a part of the specification and are to be read in conjunction therewith and in which like reference numerals are used to indicate like parts in the various views:

FIG. 1(a) is a cross-sectional view of a gas-generating apparatus having a self-regulated flow control device in an operative state; FIG. 1(b) is a cross-sectional view of a gas-generating apparatus of FIG. 1(a) in a non-operative state; FIG. 1(c) is a schematic view of an alternate self-regulated flow control device usable in the gas-generating apparatus illustrated in FIG. 1(a), wherein the alternative self-regulated flow control device is in a non-operative state; FIG. 1(d) is a schematic view of the alternate self-regulated flow control device of FIG. 1(c) in an operative state;

FIG. 2(a) is a cross-sectional view of another gas-generating apparatus having a self-regulated flow control device; FIGS. 2(b)-(d) are schematic views of different wafers and sprayer attachments suitable for use with the gas-generating apparatus of FIG. 2(a);

FIG. 4(a) is a cross-sectional view of another gas-generating apparatus; FIGS. 4(b) and 4(c) illustrate the flow control device of the gas-generating apparatus of FIG. 4(a) in a open and closed position, respectively;

FIG. 6 is a cross-sectional view of another gas-generating apparatus;

FIG. 7 is a cross-sectional view of another gas-generating apparatus having a rotating rod that can be utilized to start a reaction;

DETAILED DESCRIPTION OF THE PREFERRED EMBODIMENTS

Figure 3:
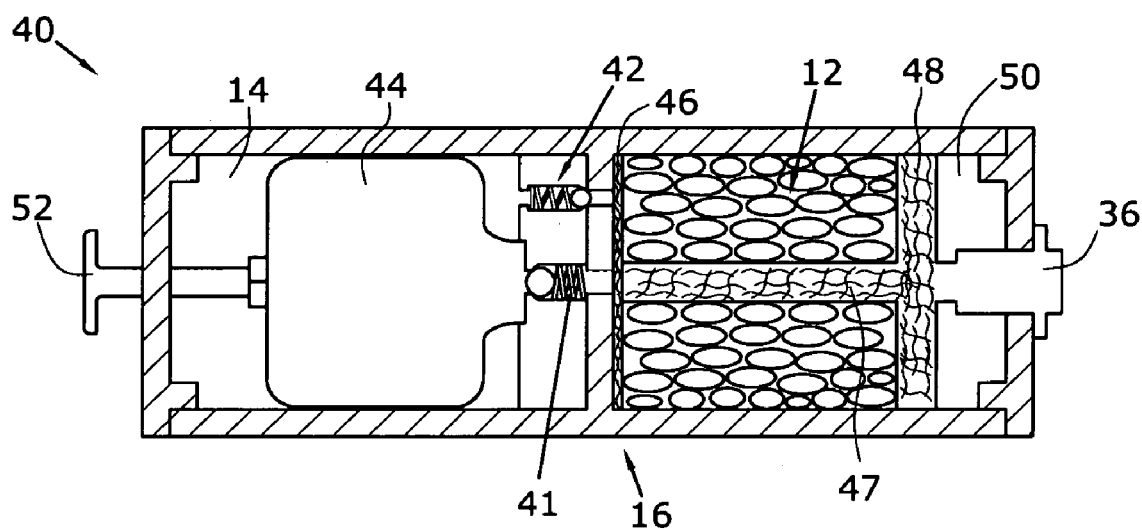
FIG. 3 is a cross-sectional view of an alternate gas-generating apparatus having a pusher to start the initial reaction.

As illustrated in the accompanying drawings and discussed in detail below, the present invention is directed to a fuel supply, which stores fuel cell fuels, such as methanol and water, methanol/water mixture, methanol/water mixtures of varying concentrations, pure methanol, and/or methyl clathrates described in U.S. Pat. Nos. 5,364,977 and 6,512,005 B2, which are incorporated herein by reference in their entirety. Methanol and other alcohols are usable in many types of fuel cells, e.g., DMFC, enzyme fuel cells and reformat fuel cells, among others.

The fuel supply may contain other types of fuel cell fuels, such as ethanol or alcohols; metal hydrides, such as sodium borohydrides; other chemicals that can be reformatted into hydrogen; or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or More Loads," published on Apr. 24, 2003, which is incorporated herein by reference in its entirety. Fuels can also include a mixture of methanol, hydrogen peroxide and sulfuric acid, which flows past a catalyst formed on silicon chips to create a fuel cell reaction. Moreover, fuels include a blend or mixture of methanol, sodium borohydride, an electrolyte, and other compounds, such as those described in U.S. Pat. Nos. 6,554,877; 6,562,497; and 6,758,871, which are incorporated herein by reference in their entireties. Furthermore, fuels include those compositions that are partially dissolved in a solvent and partially suspended in a solvent, described in U.S. Pat. No. 6,773,470 and those compositions that include both liquid fuel and solid fuels, described in United States published patent application no. 2002/0076602. These references are also incorporated by reference in their entireties.

Fuels can also include a metal hydride such as sodium borohydride ($NaBH_4$) and water, discussed above. Fuels can further include hydrocarbon fuels, which include, but are not limited to, butane, kerosene, alcohol, and natural gas, as set forth in United States published patent application no. 2003/0096150, entitled "Liquid Hereto-Interface Fuel Cell Device," published on May 22, 2003, which is incorporated herein by reference in its entirety. Fuels can also include liquid oxidants that react with fuels. The present invention is therefore not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gaseous, liquids, solids, and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to store fuels that are not used in fuel cells. These applications can include, but are not limited to, storing hydrocarbons and hydrogen fuels for micro gas-turbine engine built on silicon chips, discussed in "Here Come the Microengines," published in The Industrial Physicist (December 2001/January 2002) at pp. 20-25. As used in the present application, the term "fuel cell" can also include microengines. Other applications can include storing traditional fuels for internal combustion engines and hydrocarbons, such as butane for pocket and utility lighters and liquid propane.

Suitable known hydrogen generating apparatus are disclosed in commonly-owned, co-pending U.S. patent application Ser. Nos. 10/679,756 and 10/854,540. The disclosure of these references is incorporated herein by reference in their entireties.

In various embodiments of the present invention, the gas-generating apparatus of the present invention may include a reaction chamber and a reservoir having a second reactant. The reaction chamber can include an optional first reactant. The first and second reactants can be a metal hydride, e.g., sodium borohydride and water. Both reactants can be in gaseous, liquid, aqueous or solid form. Preferably, the first reactant stored in the reaction chamber is a solid metal hydride or metal borohydride, and the second reactant is water optionally mixed with additives and catalysts. One of the reactants may include methyl clathrates, which essentially include methanol enclosed or trapped inside other compounds. Water and metal hydride of the present invention react to produce hydrogen gas, which can be consumed by a fuel cell to produce electricity. Other suitable reactants or reagents are disclosed in Ser. No. 10/854,540, previously incorporated above.

Additionally, the gas-generating apparatus can include a device or system that is capable of controlling the transport of a second reactant from the reservoir to the reaction chamber. The operating conditions inside the reaction chamber and/or the reservoir, preferably a pressure inside the reaction chamber, are capable of controlling the transport of the second reactant in the reservoir to the reaction chamber. For example, the second reactant in the reservoir can be introduced into the reaction chamber when the pressure inside the reaction chamber is less than a predetermined value, preferably less than the pressure in the reservoir, and, more preferably less than the pressure in the reservoir by a predetermined amount. It is preferable that the flow of the second reactant from the reservoir into the reaction chamber is self-regulated. Thus, when the reaction chamber reaches a predetermined pressure, preferably a predetermined pressure above the pressure in the reservoir, the flow of the second reactant from the reservoir into the reaction chamber can be stopped to stop the production of hydrogen gas. Similarly, when the pressure of the reaction chamber is reduced below the pressure of the reservoir, preferably below the pressure in the reservoir by a predetermined amount, the second reactant can flow from the reservoir into the reaction chamber. The second reactant in the reservoir can be introduced into the reaction chamber by any known method including, but not limited to, pumping, osmosis, capillary action, pressure differential, valve(s), or combinations thereof.

As illustrated in FIG. 1(a), the gas-generating apparatus can include a reaction chamber 12 having a first reactant, a reservoir 14 having a second reactant, a self-regulated flow control device 16, and a conduit 18. Alternatively, reaction chamber 12 may contain a catalyst instead of a reactant, or reaction chamber 12 can be heated. Conduit 18 includes a first end located within reservoir 14 and an opposite second end capable of being removably connected to, or operatively associated to, reaction chamber 12. When the first reactant and the second reactant are mixed together, they react to produce hydrogen gas.

To reduce the chance of a partial vacuum forming in reservoir 14, an expanding substance can be inserted into reservoir 14 so that as reactant is transported the expanding substance at least partially replaces the transported volume. Suitable expanding materials include, but are not limited to, butane, alcohols such as methanol, pressurized balloons, among others. Alternately, a relief valve can be placed in communication with reservoir 14 to let air to enter as reactant is transported out of reservoir 14. Another device to minimize the development of a partial vacuum is discussed below. These devices are usable with any embodiments in the present invention.

Gas-generating apparatus 10 can also have an orientation device, such as mass 20, attached to a portion of conduit 18 to ensure that the first end of conduit 18 is in a fluid communication with the second reactant in reservoir 14. The mass can include any weight that is capable of moving the first end of conduit 18 to the location where the second reactant is accumulated or is located, regardless of the orientation of apparatus 10. Hence, as reactant is withdrawn from reservoir 14, the level of the liquid reactant decreases in reservoir 14, first end of conduit 18 needs to be in contact with the second reactant regardless of how apparatus 10 is positioned, e.g., sideway, diagonal or upside-down. In other words, mass 20 and the remaining reactant are pulled by gravity in the same direction thereby maintaining contact. The second end of conduit 18 is preferably enlarged, as shown, to more efficiently distribute the second reactant before it enters reaction chamber 12.

Conduit 18 can be made from any material capable of transporting the second reactant in reservoir 14 to reaction chamber 12. Preferably, conduit 18 can include any material or design that is capable of wicking liquid or providing capillary action. Suitable conduit materials include, but are not limited to, fibers, fillers, fibrous materials, open-celled foams, sand materials, or a combination thereof. Preferably, conduit 18 is flexible. Conduit 18 can have any shape that is capable of transporting the second reactant to reaction chamber 12. Conduit 18 may also comprises one or more wicking members embedded within an impermeable sheath or a solid block.

Optionally, gas-generating apparatus 10 may not include conduit 18 if gas-generating apparatus 10 is primarily utilized in a position or orientation wherein the second reactant from reservoir 14 can be introduced into reaction chamber 12 without conduit 18 by gravity feed.

Gas-generating apparatus 10 may also include layer 24 disposed between reaction chamber 12 and reservoir 14. Layer 24 has a porous surface and could be made from any material capable of evenly distributing/introducing the second reactant to the first reactant. Layer 24 is preferably a wicking material similar to conduit 18.

Furthermore, gas-generating apparatus 10 can include an optional liquid impermeable, gas permeable layer/membrane 25 that allows the passage of gases, such as hydrogen gas, out of the apparatus, and at the same time keeps liquid within reaction chamber 12. Membrane 25 can be made of any liquid impermeable, gas permeable material known to one skilled in the art. Such materials can include, but are not limited to, hydrophobic materials having an alkane group. More specific examples include, but are not limited to: polyethylene compositions, polytetrafluoroethylene, polypropylene, polyglactin (VICRY®), lyophilized dura mater, or combinations thereof. Gas permeable member 25 may also comprise a gas permeable/liquid impermeable membrane covering a porous member. Examples of such membrane are CELGARD® and GORE-TEX®. Other gas permeable, liquid impermeable members usable in the present invention include, but are not limited to, SURBENT® Polyvinylidene Fluoride (PVDF) having a porous size of from about 0.1 µm to about 0.45 µm, available from Millipore Corporation. The pore size of SURBENT® PVDF regulates the amount of water exiting the system. Materials such as electronic vent type material having 0.2 µm hydro, available from W. L. Gore & Associates, Inc., can also be used in the present invention. Additionally, 0.25 inch diameter rods having a pore size of about 10 µm or 2 inch diameter discs with a thickness of about 0.3 µm available from GenPore, and sintered and/or ceramic porous material having a pore size of less than about 10 µm available from Applied Porous Technologies Inc. are also usable in the present invention. Furthermore, nanograss materials, from Bell Labs, are also usable to filter the liquid. Nanograss controls the behavior of tiny liquid droplets by applying electrical charges to specially engineered silicon surfaces that resemble blades of grass. Additionally, or alternatively, the gas permeable, liquid impermeable materials disclosed in commonly owned, co-pending U.S. patent application Ser. No. 10/356,793 are also usable in the present invention, all of which are incorporated herein by reference in their entireties.

Valve 36 is preferably a shut-off valve and can be any valve that is capable of transporting the produced gas to a desired location, such as a fuel cell. Valve 36 is opened when hydrogen gas is needed, and valve 36 is closed when there is no demand for hydrogen gas. Valve 36 can also be manually controlled by a user or automatically controlled by a CPU or controller, as needed. Valve 36 can be a check valve, a duckbill valve, a solenoid valve, magnetic valve, and other mechanical and/or electrical valves. Suitable shut-off valves usable in the present invention further include the shut-off valves disclosed in commonly owned, co-pending patent application Ser. Nos. 10/978,949, filed on Nov. 1, 2004, and Ser. No. 10/629,006, filed on Jul. 29, 2003. The disclosures of these references are incorporated herein by reference in their entireties. Alternatively, valve 36 may stay open and another valve within the fuel cell or the device can be opened and closed to control the flow of hydrogen.

In this embodiment, the enlarged second end of conduit 18 is operatively associated with self-regulated flow control device 16. Except for flow control device 16, reaction chamber 12 and reservoir 14 are isolated from each other by partition 23. As illustrated in FIG. 1(a), flow control device 16 includes a disk 26 biased by spring 22. Both disk 26 and spring 22 are enclosed by partition 23. Disk 26 is movable relative to partition 23 and forms a seal therewith. Seal 21, e.g., o-ring, can be incorporated in disk 26, as shown, to provide the seal. Preferably, disk 26 includes at least a substantially impermeable surface that supports the enlarged second end of conduit 18, or disk 26 can be made from substantially impermeable material(s).

In an operative or flow state, the enlarged second end conduit 18 is connected to or is in contact with wicking layer 24 to establish a flow channel, and the second reactant from reservoir 14 is transported by wicking or capillary action into reaction chamber 12 to react to form hydrogen gas. The production of gas increases the pressure inside reaction chamber 12. The increased gas pressure applies a force on disk 26 against biasing spring 22, since disk 26 is substantially impermeable to gas and conduit 18, when wet with the second reactant, is capable of resisting the gas from traveling down conduit 18. Furthermore, seal 21 resists the fingering and/or leaking of hydrogen gas around disk 26. Hence, the gas pressure when valve 36 is closed acts on movable disk 26. At or above a predetermined pressure, the gas pressure within reaction chamber 12 separates disk 26 and the enlarged second end of conduit 18 from wicking layer 24 creating a space 37, as shown in FIG. 1(b). The separation of conduit 18 from wicking layer 24 breaks the capillary flow path and stops the transport of the second reactant.

When hydrogen gas is needed, valve 36 is opened manually, electronically, or automatically, the gas pressure in reaction chamber 12 is released. Once the pressure in reaction chamber 12 decreases below the predetermined pressure, spring 22 pushes disk 26 and the enlarged second end of conduit 18 into contact with wicking layer 24 to restart the flow of the second reactant into reaction chamber 12 and hydrogen production. When hydrogen gas is no longer needed, valve 36 is closed and the pressure inside reaction chamber 12 increases until reaching the predetermined pressure, whereby this elevated pressure separates the enlarged second end of conduit 18 from disk 24 to stop the flow of the second reactant into the reaction chamber thereby stopping hydrogen production.

Thus, flow control device 16 is self-regulated such that in an operative state or ON position, the first end of conduit 18 is spring-based into contact with reaction chamber 12 to transport the second reactant into the reaction chamber 12 by wicking or capillary action. In a non-operative state or OFF position, the pressure in reaction chamber 12 above the predetermined pressure separates conduit 18 from reaction chamber 12 to stop the flow of the second reactant into reaction chamber 12 and to stop the production of hydrogen.

To minimize the buildup of partial pressure in reservoir 14 and in addition to the venting devices described above, baffle 140, which is a venting mechanism that allows the hydrogen gas from reaction chamber 12 to enter reservoir 14, can be provided around conduit 18. An exemplary suitable venting mechanism is fully described in commonly owned U.S. Pat. No. 5,906,446 directed to a writing instrument. The '446 patent teaches a venting mechanism that allows air to enter the ink reservoir to minimize vacuum buildup, while keeping the ink from flowing through the venting mechanism. The '446 patent is incorporated by reference herein in its entirety.

Figure 11:
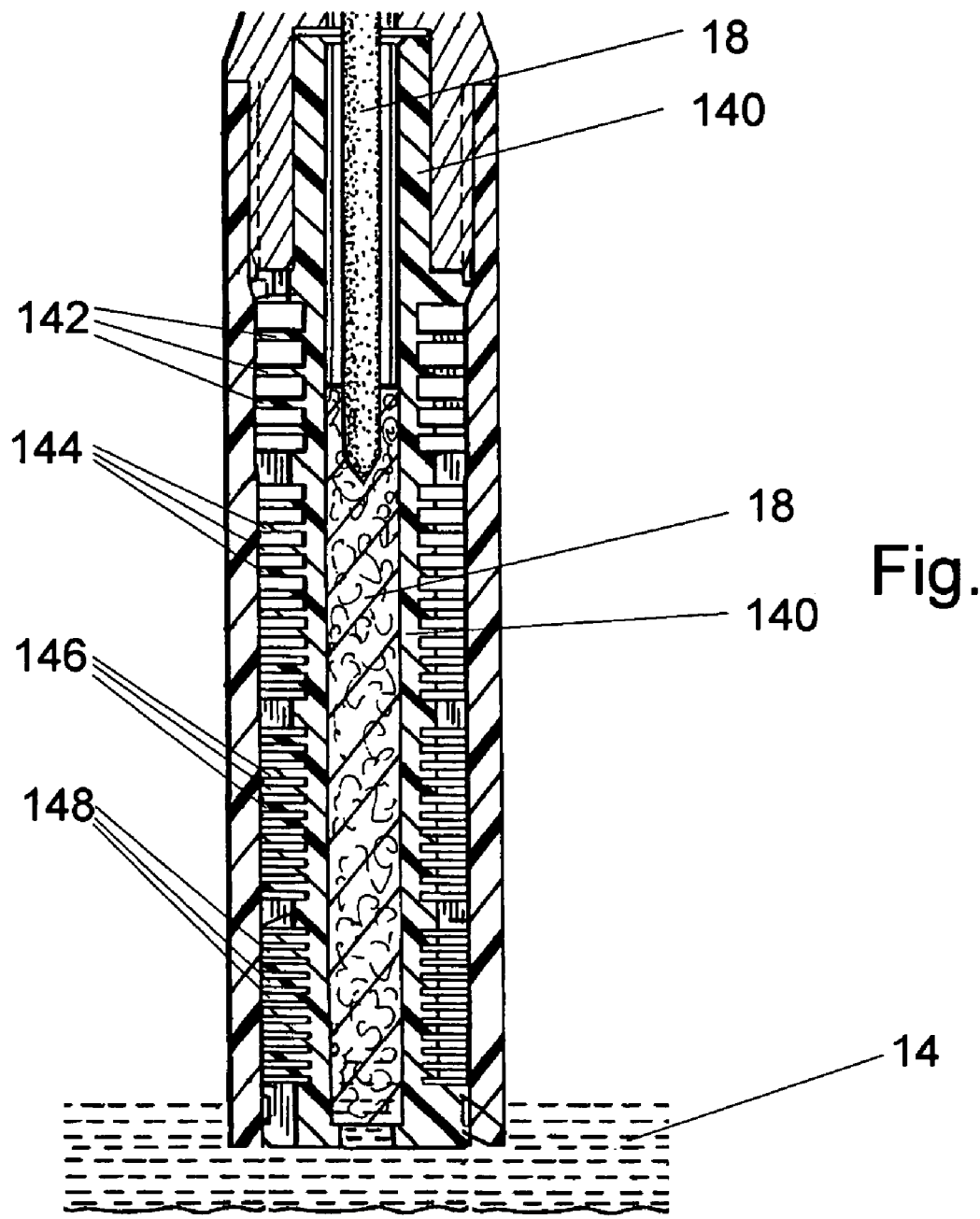
FIG. 11 is a partial cross-sectional view of a baffle or venting mechanism usable to minimize the build up of partial pressure within the reactant reservoir.

As shown in the figures of the '446 patent and reproduced partially herein as FIG. 11, baffle 140 surrounds the wicking element and comprises a plurality of ribs 142, 144, 146, 148, et seq. The spacing between these ribs is decreasing in the direction from reaction chamber 12 toward reservoir 14. More specifically, ribs 142 located closer to reaction chamber 12 have relatively larger spacing than the next set of ribs 144, and ribs 144 have spacing that is relatively larger than the spacing in ribs 146 which are closer to reservoir 14, and so on. Any number of sets of ribs can be used and the present invention is not limited to any particular sets of ribs.

This arrangement allows hydrogen to communicate from reaction chamber 12 into reservoir 14, but does not allow reactant to flow from reservoir 14 to reaction chamber, when a partial vacuum of a predetermined level is present in reservoir 14. As discussed above, the flow of reactant is controlled through conduit 18, which as shown can comprise two or more different wicking materials.

An alternate self-regulated flow control device 16 is illustrated in FIGS. 1(c) and 1(d). The self-regulated flow control device has housing 32 that includes movable member 30 biased by spring 28. Housing 32, at one end, is connected to reaction chamber 12 by pressure inlet port 34 so that the pressure in reaction chamber 12 is communicated through inlet channel 34 and acts on movable member 30 against the biasing force.

Movable member 30 preferably includes a portion of the conduit 18 therein, as illustrated in FIGS. 1(c) and 1(d) and labeled as 19. When the pressure in reaction chamber 12 is less than the predetermined pressure, spring 28 is sized and dimensioned to push and at least partially align member 30 so that at least a partial flow path is established. Hence, in an operative state or ON position the force of spring 28, at least partially, aligns section 19 with conduit 18 to form a continuous capillary flow path between the first end of conduit 18 and the enlarged second end of conduit 18. The second reactant in reservoir 14 can flow from the first end of conduit 18 to the second end of conduit 18 and into reaction chamber 12 to react and produce hydrogen.

When pressure in reaction chamber 12 exceeds the predetermined value, as illustrated in FIG. 1(c), the pressure communicates to movable member 30 via port 34 and displaces member 30 against spring 28, so that section 19 is no longer aligned with conduit 18. Hence, in the non-operative state or OFF position, this misalignment stops the flow of the second reactant into reaction chamber 12. Similar to the embodiment illustrated in FIGS. 1(a) and 1(b), when valve 36 is opened the pressure in reaction chamber 12 decreases. The relief of the pressure allows spring 28 to move section 19 within member 30 to align at least partially with conduit 18 to re-start the flow of the second reactant into reaction chamber 12. Optional seals can be provided between movable member 30 to separate conduit 18 from section 19 in the OFF position, between conduit 18 and spring 28 or between conduit 18 and pressure port 34.

As illustrated in FIGS. 1(a) and 1(b), the first reactant is shown as solid. However, the first reactant can be in aqueous or liquid form. Additives such as stabilizers, catalysts or other additives can be mixed or blended with either the first or second reactants or both. Solid reactant includes, but is not limited to, powder, pellets, porous structures, spheres, tubes, soluble sheaths or combinations thereof. The present invention is not limited to any particular fuel or additives or how the additives are mixed, blended, or stored in the gas-generating apparatus.

In another embodiment illustrated in FIG. 2(a), gas-generating apparatus 40 includes self-regulated flow control device 16, which has a self-regulated gas pressure control device 42 or gas valve 42 and a self-regulated liquid control device 41 or liquid valve. Flow control device 16 connects reservoir 14 to reaction chamber 12. Reservoir 14 can include a bladder or liner 44 holding the second reactant. Bladder 44 can be made from any material, including flexible material or elastic material. Suitable bladders are disclosed in commonly owned, co-pending application Ser. No. 10/629,004, the disclosure of which is incorporated herein by reference in its entirety. Alternatively, instead of bladder 44 reservoir 14 can have any member that can separate the pressurization from the second reactant, such as a movable wall forming a seal with reservoir 14 or an extensible liner adapted to receive the pressurized gas. Similar to the embodiments described above, reaction chamber 12 may also have wicking layer 46 (similar to wicking layer 24) to improve the distribution of the second reactant in reaction chamber 12. Reaction chamber 12 may also have a filler disk 48 made of wicking material or a liquid impermeable, gas permeable membrane (similar to membrane 25) to define a separate gas collecting chamber 50. Valve 36 is provided to transport the hydrogen gas from chamber 50 or from reaction chamber 12 to a fuel cell. Disk 48 may be connected to optional rod 47 made from similar material for support or to distribute the second reactant through a column of first reactant. As illustrated in FIGS. 2(b)-2(d), first reactant does not necessarily have pellet form, but may be formed into zig zag-shaped wafers, linear wafers, or grid-shaped wafers, respectively. Additionally, gas-generating apparatus 40 may include spray attachment 39, as illustrated in FIGS. 2(b)-2(d), to evenly distribute the second reactant onto the first reactant wafers.

Self-regulated flow control device 16 allows the second reactant to enter reaction chamber 12 under certain conditions. Preferably, self-regulated flow control device 16 comprises gas valve 42 and liquid valve 41 connecting bladder 44 containing the second reactant to reaction chamber 12 containing the first reactant. Initially, after gas-producing apparatus 40 is constructed, reservoir 14 is pressurized so that a small amount of second reactant is transported into reaction chamber 12 to start the reaction to produce hydrogen gas. As the pressure inside reaction chamber 12 increases, it equalizes the pressure in reservoir 14. When the pressures in these two compartments are within a predetermined difference, e.g., X psi, gas valve 42 opens to equalize the pressures within these two compartments. When these two pressures are substantially equal, i.e., within X psi of each other, the pressure applied to bladder 44 cannot open liquid valve 41, and no flow of the second reactant occurs. Hence, gas producing apparatus 40 is in the non-operative state or OFF position when reaction chamber 12 is pressurized. In one example, X psi is a predetermined value that can be from about 1 psi to about 20 psi, preferably X can be about 5 psi, and more preferably X can be about 2 psi.

When hydrogen is needed, shut-off valve 36 opens and gas-producing apparatus 40 is in the operative or ON position. As the hydrogen gas is transported out of gas-collecting chamber 50 or reaction chamber 12, the pressure within reaction chamber 12 decreases. When the pressure difference between reservoir 14 and reaction chamber 12 exceeds X psi, gas valve 42 closes thereby preserving the higher pressure in reservoir 14. The preserved pressure in reservoir 14 is applied to bladder 44 which opens liquid valve 41 and transport the second reactant into reaction chamber 12 to react with the first reactant.

Once the preserved higher pressure in reservoir 14 is bled off, the pressures in the two chambers are again within X psi. The produced gas in reaction chamber 12 opens gas valve 42 until the pressure from reaction chamber 12 equalizes to the pressure in reservoir 14 and closes liquid valve 41 to stop the flow of the second reactant and thereby the reaction. To continue the reaction to produce hydrogen, shut-off valve 36 is closed, preferably before all of the preserved higher pressure in reservoir 14 is bled off and while the pressures are within X psi of each other. This closure allows both chamber 12 and reservoir 14 to re-pressurize (since gas valve 41 remains open). Once the pressure has reached a desired level, valve 36 is re-opened to start the cycle again. The opening and closing of valve 36 is cyclical and can be controlled by a CPU or a controller. A pressure gage can be inserted into gas-producing apparatus 40 and is readable by the CPU/controller to control the open/close cycle. An exemplary operating cycle of gas-generating apparatus 40 is summarized below.

TABLE 1

Operation by Cycling Valve 36

| | Liquid valve 41 | Gas valve 42 | $P_{12}$ vs. $P_{14}$ | Valve 36 |
|---|---|---|---|---|
| Initial setting | Close | Close | $P_{12} = P_{14}$ | Close |
| Open valve 36 | Open | Close | $P_{12} < P_{14}$ | Open |
| Hydrogen produced | Close | Open | $P_{12} > P_{14}$ | Close |
| Open valve 36 | Open | Close | $P_{12} < P_{14}$ | Open |
| Hydrogen produced | Close | Open | $P_{12} > P_{14}$ | Close |
| Cycle repeats . . . until hydrogen demand is terminated and valve 36 is closed. | | | | |

Alternatively, to maintain the production of hydrogen without cycling shut-off valve 36, bladder 44 in reservoir 14 can be continuously pressurized for example by compressed gas. Preferably, reservoir 14 has a sufficient amount of liquefied hydrocarbon, such as N-butane, isobutane, or an isobutane and propane blend. The liquid-gas phase diagram of these materials is such that as long as some of the hydrocarbon remains in liquid form, its pressure is constant. In one example, the pressure within reservoir 14 is maintained at 17 psi (using N-butane at room temperature) and when the pressure in reaction chamber 12 reaches within or greater than X psi of 17 psi, gas valve 42 opens to equalize the pressure and no significant pressure differential across liquid valve 41 exists to open it; therefore, no flow occurs. When hydrogen gas is needed, valve 36 opens and the pressure differential between the two chambers is more than X psi and gas valve 42 closes. The pressure in reservoir 14 is then applied to bladder 44 to open liquid valve 41 to transport the second reactant to reaction chamber 12 until valve 36 is closed. To minimize or prevent the pressurizing gas in reservoir 14 from entering reaction chamber 12, gas valve 42 can be a one-way valve, i.e., only allowing hydrogen gas from reaction chamber 12 to enter reservoir 14. Also, when reservoir 14 is pressurized, gas valve 42 can be omitted and the varying pressure differentials between reservoir 14 and reaction chamber 12 are sufficient to open and close liquid valve 41. This embodiment is discussed further below and in reference to FIG. 5(a). Also, a microporous membrane can be positioned adjacent to gas valve 42. Suitable microporous membranes should have pore size large enough to allow the smaller hydrogen molecules to pass through while small enough to block the larger hydrocarbon molecules.

Alternatively, isobutane or isobutane/propane blend can be used instead of N-butane, which provides a pressure of about 31 psi and 50 psi, respectively. X psi can be any pressure, e.g., 2 psi, 4 psi, 6 psi, etc.

In another operating mode, the rate of hydrogen production in reaction chamber 12 is higher than the rate of hydrogen exiting shutoff valve 36. Hence, when valve 36 is in an open position, the pressure inside reaction chamber 12 continues to increase to a pressure greater than the pressure in the reservoir 14. When the pressure in reaction chamber 12 exceeds the pressure inside reservoir 14 by a predetermined value, liquid valve 41 is closed to stop the second reactant from entering reaction chamber 12 and gas valve 42 is opened to allow the pressure inside the reaction chamber 12 to be at least substantially equal to the pressure inside reservoir 14. Given that the hydrogen is in continuous demand, the pressure inside reaction chamber 12 reduces to a pressure less than the pressure in reservoir 14, which results in gas valve 42 closing and liquid valve 41 opening. A summary of this operating mode is illustrated in Table 2 below.

TABLE 2

Operation without Cycling Valve 36 and Pressurizing Reservoir 14

| | Liquid valve 41 | Gas valve 42 | $P_{12}$ vs. $P_{14}$ | Valve 36 |
|---|---|---|---|---|
| Initial setting | Close | Close | $P_{12} = P_{14}$ | Close |
| Open valve 36 | Open | Close | $P_{12} < P_{14}$ | Open |
| Hydrogen produced at a rate greater than required | Close | Open | $P_{12} > P_{14}$ | Open |
| | Open | Close | $P_{12} < P_{14}$ | Open |

In practice, gas-generating apparatus 40 may operate by the operating mode illustrated in Table 2 when it is relatively new, i.e., when the apparatus is new and the reaction rate is relatively high. When the reactants are near depletion and the reaction rate falls below a certain rate, gas-generating apparatus may operate by the operating cycle illustrated in Table 1.

Gas-generating apparatus 40 may further include a relief valve 43. The purpose of relief valve 43 is to prevent having excess pressure build up in reaction chamber 12. For instance, relief valve 43 can be a valve that is capable of opening once the pressure in reaction chamber 12 reaches a predetermined value. Preferably, relief valve 43 is a check valve. Alternatively, relief valve 43 can manually be opened to vent some of the hydrogen in hydrogen storage area 50. Membrane 25 can be used with relief valve to prevent liquid from leaving apparatus 40.

As illustrated in FIG. 3, an optional starter 52 can be included in gas-generating apparatus 40. Starter 52 can apply an initial pressure on bladder 44 to introduce the second reactant into reaction chamber 12 to start a reaction. Starter 52 can be any type of starter known to one skilled in the art. It can be a manual starter or an automatic starter that is capable of starting an initial reaction once the gas-generating apparatus is connected to an instrument that demands the generated gas. For example, starter 52 can be a button, a pumping mechanism, a sliding mechanism, and/or a screw that can be pressed, moved, or rotated to provide a direct or indirect pressure on bladder 44 to introduce at least some of the second reactant into reaction chamber 12. Exemplary starters are also illustrated in FIGS. 8(a)-8(d).

Referring to FIGS. 4(a)-4(c), self-regulating flow control device 16 may comprise diaphragm 56, which is adapted to cover opening 54 of bladder 44 to stop the flow of the second reactant or to uncover opening 54 to allow the flow of the second reactant into reaction chamber 12. Diaphragm 56 responds to the pressure differential between reservoir 14 and reaction chamber 12. As illustrated, reservoir 14 is pressurized by a compressed gas, spring, foam, liquefied hydrocarbon, or other pressurizing mechanism to provide a substantially constant pressure on bladder 44. Initially, before first use, due to the higher pressure in reservoir 14, an amount of the second reactant is transported through opening 54 and holes 55 on diaphragm 56 to react with the first reactant. The produced hydrogen pressurizes reaction chamber 12 until the pressure in reaction chamber 12 is within X psi from the pressure in reservoir 14. Diaphragm 56 is sized and dimensioned so that within X psi, it closes opening 54, as shown in FIG. 4(c) and stops the flow of the second reactant. When hydrogen gas is needed, shut-off valve 36 opens and the pressure in reaction chamber 12 decreases. Diaphragm 56 opens, as shown in FIG. 4(b), allowing flow of the second reactant into reaction chamber 12 to produce hydrogen on demand. When hydrogen is no longer needed, valve 36 is shutoff and reaction chamber 12 re-pressurizes to stop flow.

Figure 5A:
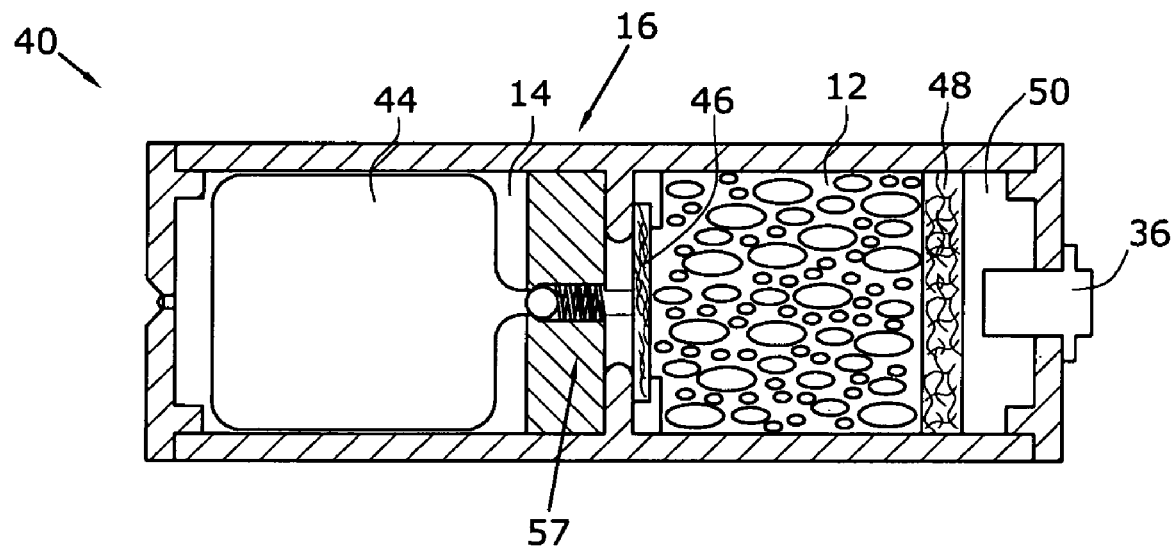
FIGS. 5(a) and 5(b) show variations of the embodiment of FIG. 4(a)
Figure 5B:
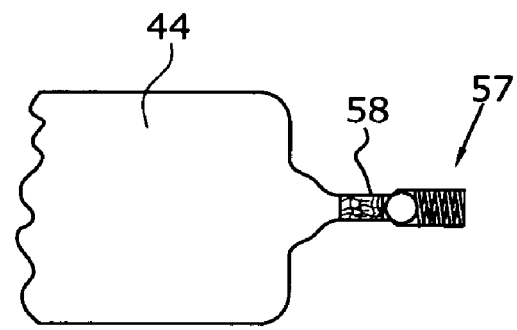

Referring to FIG. 5(a), diaphragm 56 can be replaced by check valve 57 which opens and closes under the same conditions as diaphragm 56. FIG. 5(b) illustrates a flow regulator 58. Preferably, regulator 58 is made from a filler material that has the capability of absorbing the second reactant. As such, any material capable of absorbing the second reactant can be utilized in the present invention. Suitable materials include foam, fillers or fibrous materials. Other options include, but are not limited to, the use of recovering valve and atomization restriction.

As illustrated in FIG. 6, gas-generating apparatus 40 can include a starter 64 connected to a valve 65 and a movable member or piston 68. Starter 64 can be pushed to open valve 65 to introduce the second reactant into reaction chamber 12 to start the reaction. Starter 64 can be a manual starter or an automatic starter capable of starting an initial reaction once gas-generating apparatus 40 is connected to a device that demands the generated hydrogen gas. Movable member 68 also includes an optional valve 69. When optional valve 69 is used in the present invention, starter 64 can be used to start the initial reaction. Once the initial reaction starts and reaction chamber 12 is pressurized, this pressure is applied to piston 68 tending to open optional valve 69 to allow the flow of the second reactant into reaction chamber 12.

To create a seal between movable member 68 and the wall(s) of gas-generating apparatus 40, and to separate the second reactant from the first reactant, movable member 68 may have one or more seals 62, such as an o-ring. Furthermore, to compensate for the friction between movable member 68 and the wall(s) of gas-generating apparatus 40, optional spring(s) 66 can be located in reaction chamber 12, as shown in FIG. 6.

Once the reaction starts, the pressure in reaction chamber 12 increases to a predetermined level, such that the pressure in reaction chamber 12 closes valve 69 to stop the flow of the second reactant coming into reaction chamber 12. To minimize the vacuum developing in reservoir 14 and to apply and/or maintain a pressure on the second reactant, movable member 68 is biased toward reservoir 14 by spring 66. After the pressure in reaction chamber 12 is reduced by the opening of valve 36, the higher pressure in reservoir 14 opens valve 69 to transport additional second reactant into reaction chamber 12 to produce more hydrogen. Alternatively, when optional valve 69 is not incorporated into movable member 68, starter 64 can be pushed to open valve 65 and start the flow of the second reactant into reaction chamber 12 when needed.

Another embodiment is illustrated in FIG. 7. This embodiment is similar to FIG. 6, except that spring 66 is located in reservoir 14 and movable member 68 does not include valve 69. Furthermore, starter 64 is replaced with shaft 71 having a valve or ending 17 that is rotatable. The rotational movement of shaft 71 causes valve 17 to reciprocate linearly; thereby starting and stopping the flow of the second reactant into reaction chamber 12. The valve system, as shown in FIG. 7, is generally known in the industry as a "linear control valve," or a "globe valve." Thus, to start the initial reaction shaft 71 is rotated to open valve 17. The process of producing hydrogen in this embodiment is similar to the process discussed in relation to FIG. 6. However, in this embodiment, when member 68 is moved towards reservoir 14, the movement of member 68 rotates valve 17 connected to shaft 71 to stop the flow of the second reactant into reaction chamber 12. When the pressure in reaction chamber 12 is reduced below a predetermined pressure, spring 66 pushes movable member 68 towards reaction chamber 12, which, in turn, rotates and opens valve 17 connected to shaft 71.

Figure 8A:
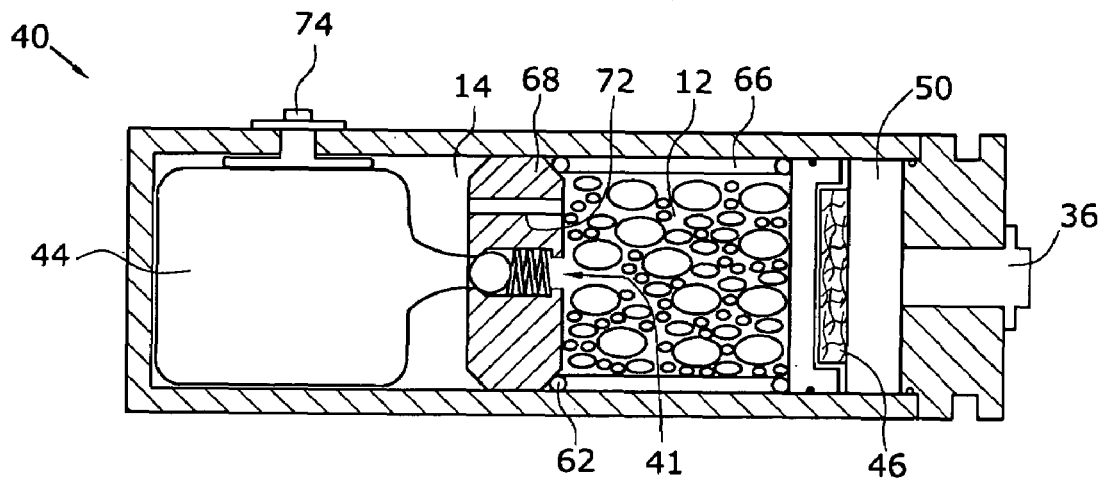
FIG. 8(a) is a cross-sectional view of another gas-generating apparatus having a push button to start the reaction.

FIG. 8(a) illustrates another embodiment of the present invention. In this gas-generating apparatus, reaction chamber 12 is separated from reservoir 14/bladder 44 by movable piston 68. However, reaction chamber 12 is in constant fluid communication with reservoir 14 through opening 72 defined on piston 68. Movable piston 68 is also biased toward reservoir 14 by spring 66 located within reaction chamber 12. To start the reaction, starter 74 is activated, e.g., by pushing. The pressure created by the activation of starter 74 opens check valve to release the second reactant into reaction chamber 12 to react with the first reactant. Hydrogen gas is produced which pressurizes the entire gas-generating apparatus. When valve 36 is opened, hydrogen gas is released. Since there is no pressure differential between reservoir 14 and reaction chamber 12, nothing stops the flow of the second reactant into reaction chamber 12. Therefore, hydrogen is produced until all the reactants are spent.

Figure 8B:
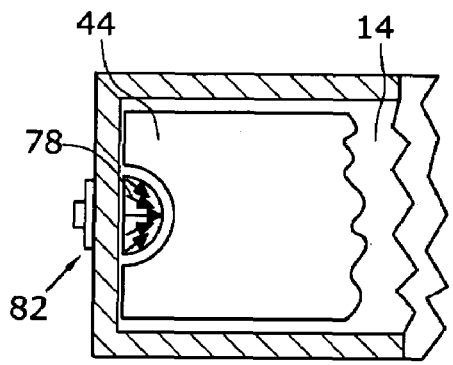
FIGS. 8(b)-8(d) are partial cut-away schematic views illustrating different starting mechanisms usable with the gas-generating apparatus of FIGS. 3 and 8(a)
Figure 8C:
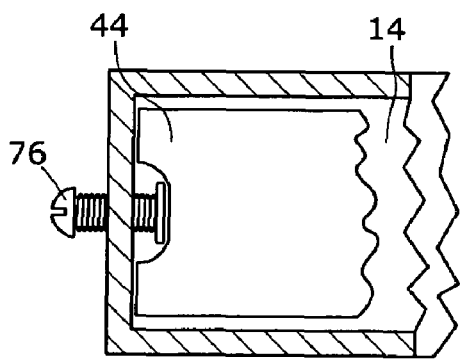
Figure 8D:
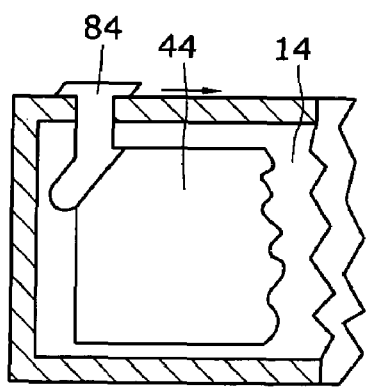
Figure 9A:
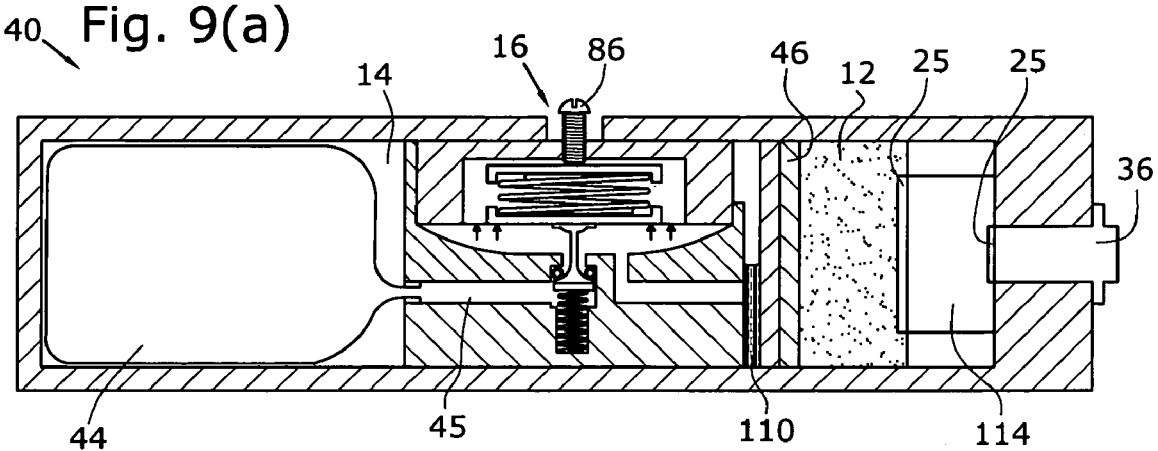
FIG. 9 (a) is a cross-sectional view of another gas-generating apparatus having a self-regulated flow control device that can include a diaphragm.
FIG. 9(b) is an enlarged cross-sectional view of the self-regulated flow control device of FIG. 9(a)
FIG. 9(c) is an enlarged cross-sectional view of the self-regulated flow control device of FIG. 9(a) when the self-regulated flow control device is in a closed position.
FIG. 9(d) is an enlarged cross-sectional view of the self-regulated flow control device of FIG. 9(a) when the self-regulated flow control device is in an open position.
Figure 9B:
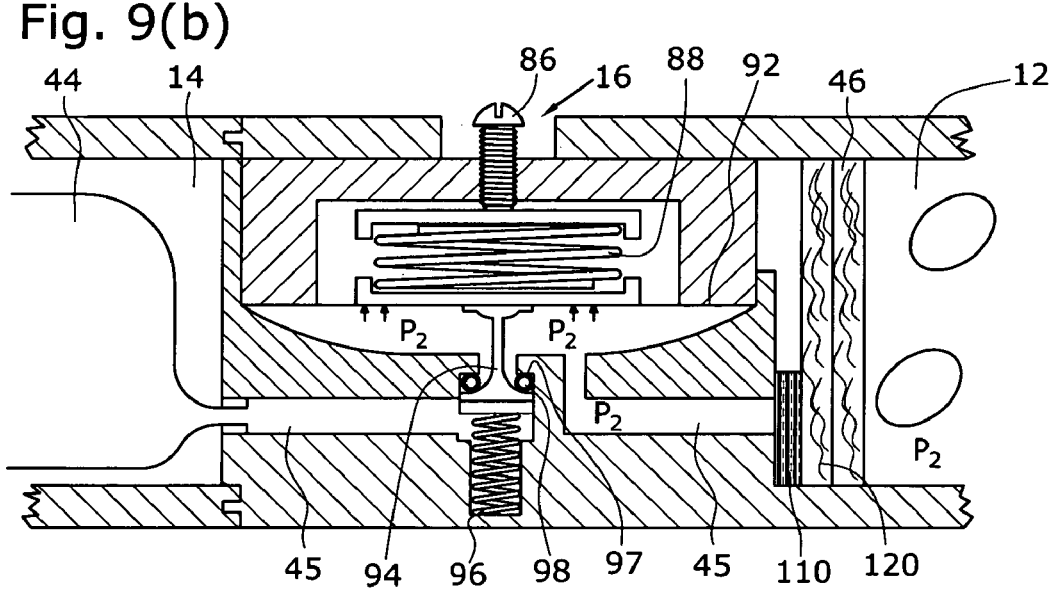
Figure 9C:
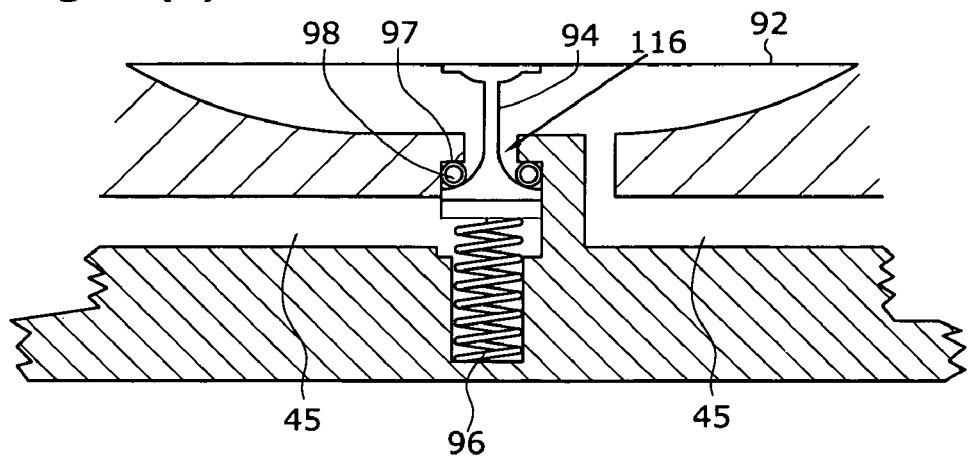
Figure 9D:
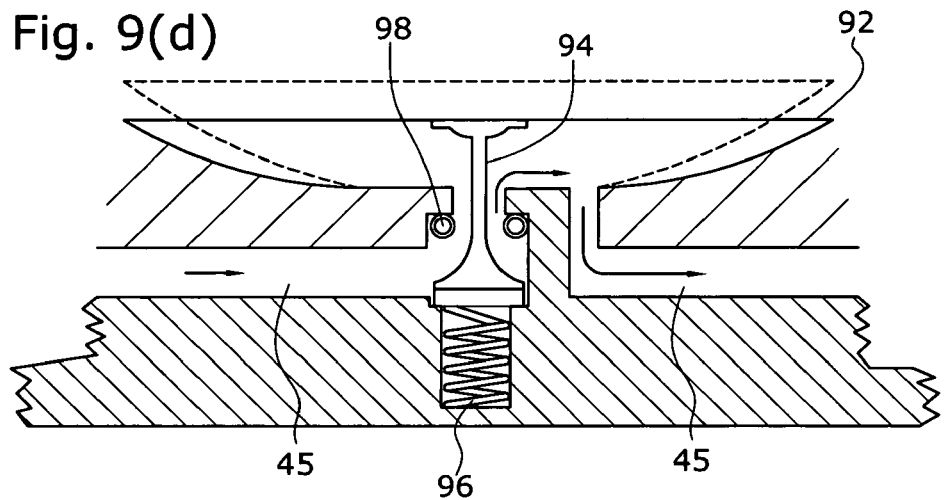

FIGS. 8(b)-8(d) illustrate other types of staffers. As illustrated in FIG. 8(b), push button 74 can be replaced with a pump button 82 that can fill a bladder 78 with a gas, such as air. Bladder 78 can place a force on bladder 44 to introduce at least some or a predetermined amount of the second reactant into reaction chamber 12. Additionally, as illustrated in FIG. 8(c), push button 74 can be replaced with a screw-type device 76 that can be turned to place a force on bladder 44. Other optional embodiments can include, for example, a sliding mechanism or sliding switch 84 as illustrated in FIG. 8(d). In this embodiment, when sliding switch 84 is moved in a predetermined direction, it can place a force on bladder 44 to release some of or a predetermined amount of the second reactant into reaction chamber 12.

Another embodiment of the present invention is illustrated in FIGS. 9(a)-9(d). This gas-generating apparatus includes reaction chamber 12 having a first reactant connected to reservoir 14 having a second reactant through self-regulated flow control device 16. Reservoir 14 and bladder 44 can be removably connected to control device 16. When reservoir 14 is removably connected to control device 16, preferably bladder 44 has a check valve to seal the bladder and conduit 45 has a corresponding check valve to seal the conduit and to mate with the check valve on bladder 44 to establish a flow path there between. Suitable corresponding valve components are fully disclosed in U.S. patent application Ser. Nos. 10/629, 006 and 10/978,949, which are incorporated herein by reference in their entireties. Also preferably, reservoir 14 is pressurized as discussed above, preferably with liquefied hydrocarbon.

Self-regulating flow control device 16 comprises conduit 45/diaphragm 92 interacting with or operatively associated with rod 94. Rod 94 is disposed within conduit 45. In a non-operative or OFF position as best shown in FIG. 9(*c*), rod 94 compresses seal 98 against sealing surface 97 to prevent flow. Conduit 45, as illustrated, has several turns. However, the actual shape of the flow path is not important and the present invention is not limited to any particular shape for conduit 45. Preferably, seal 98 is under compression without a shear component to extend the life of seal 98. This can be accomplished by a non-angular sealing surface, such as sealing surface 97. In an operative or ON position as best shown in FIG. 9(*d*), rod 94 and seal 98 are moved from sealing surface 97 to allow flow therethrough. Seal 98 includes O-rings, wipers or any known sealing element.

Diaphragm 92 and rod 94 are balanced between optional upper spring 88 and lower spring 96. These springs are pre-loaded to correspond to a predetermined pressure of reaction chamber 12, above which the gas-generating apparatus is closed. Optional adjuster 86 is provided to adjust the relative pre-load of the springs. As best shown in FIG. 9(*b*), a pressure P2 from reaction chamber is communicated back into conduit 45 (hydraulically through the liquid second reactant or through the produced hydrogen). Pressure P2 acts on the bottom of diaphragm 92, and when P2 is sufficiently high, P2 pushes diaphragm 92 and rod 94 upward to close the flow path of conduit 45. The pre-loadings of springs 88 and 96 or the relative pre-loadings of these springs determine the pressure, at which P2 should reach before conduit 45 is shut-off. Alternatively, one of springs 88 and 96 can be omitted. For example, spring 96 can be omitted leaving spring 88 to counter-balance against pressure P2 acting on diaphragm 92.

Similar to the other embodiments, reaction chamber 12 has valve 36, at least one liquid impermeable, gas permeable membrane 25 covering the entrance thereof. Reaction chamber 12 also has at least one filler/filter 46, at least one screen 110 that is capable of preventing or at least reducing the number of particles that enter the area of diaphragm 92, at least one diffusion mesh 114 to minimize the clogging of the gas-generating apparatus, and at lease one diffusion mesh 120, which prevents screen 110 from plugging. Optionally, gas-generating apparatus 40 includes a gas impermeable member between bladder 44 and seal 98 to prevent any gas from entering bladder 44.

Figure 10:
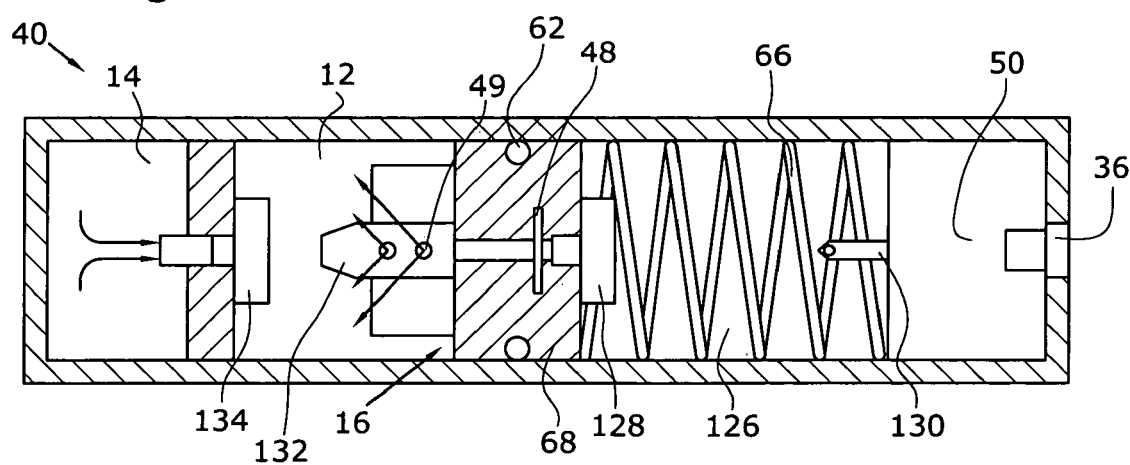
FIG. 10 is a cross-sectional view of another gas-generating apparatus.

Another embodiment is illustrated in FIG. 10. In this embodiment, gas-generating apparatus 40, in addition to reservoir 14 and reaction chamber 12, includes chamber 126. Chamber 126 is separated from reaction chamber 12 by movable member 68, which has valve components 132 and 128 disposed thereon. Preferably, gas permeable/liquid impermeable member 48 is disposed between valve components 132 and 128 to retain liquids in reaction chamber 12 while allowing any produced gas to pass out of reaction chamber 12. Chamber 126 further comprises male valve 130, which is adapted to connect to female valve 128.

Movable member 68 shuttles between shut-off valve 36 and reservoir 14. On one side, movable member 68 is biased by spring 66, and on the other side it can be pushed by the gas produced in reaction chamber 12. When movable member 68 is pushed toward shut-off valve 36, valve 130 connects to valve 128 to transfer the gas from reaction chamber 12 to gas chamber 50. When movable member 68 is pushed toward reservoir 14, valve 134 connects to valve 132 to transfer additional second reactant from reservoir 14 to reaction chamber 12.

Preferably, prior to the first use, reaction chamber 12 includes a pressurized gas, such as inert gases, air or hydrogen. The gas pressurizes reaction chamber 12 to a level approaching the predetermined pressure that pushes movable member 68 for a distance that enables female valve 128 be suitably in contact with male valve 130. When production of hydrogen is required, valve 36 is opened to release the stored gas. This release reduces the pressure in gas chamber 50 and also in reaction chamber 12. When the pressure in reaction chamber 12 falls below a predetermined level, spring 66 pushes movable member 68 towards reservoir 14. Preferably, spring 66 pushes movable member 68 for a distance sufficient to insert male valve 132 into female valve 134. The insertion of male valve 132 into female valve 134 opens a pathway so that the second reactant in reservoir 14 can flow into reaction chamber 12 via orifices 49. Once the second reactant is introduced into reaction chamber 12, it reacts preferably with the first reactant to produce hydrogen. The produced hydrogen increases the pressure in reaction chamber 12. When the pressure reaches a predetermined value or exceeds the pressure exerted on movable member 68 by spring 66, movable member 68 is pushed towards male valve 130. The connection of male valve 130 with female valve 128 opens a path for the produced hydrogen to exit reaction chamber 12 into chamber 50 and then out of gas-generating apparatus 40 via valve 36.

The cycle then repeats and movable member 68 is again moved towards reservoir 14 to connect valve 134 to valve 132 to transport additional second reactant into reaction chamber 12. Preferably, reservoir 14 is pressurized and the second reactant is stored in bladder 44, as discussed above.

In each of the embodiments described above, gas-generating apparatus 40 includes a reaction chamber 12 and a reservoir 14. In some exemplary embodiments, the first reactant in reaction chamber 12 and/or the second reactant in reservoir 14 or bladder 44 can include at least one of an optional catalyst, a hydrogen bearing fuel, an agent (e.g., water) that can react with the hydrogen bearing fuel in the presence or absence of the catalyst to produce a gas, and optionally an additive. Preferably, the agent can react with the hydrogen bearing fuel in the presence of a catalyst to create the desired gas. Preferably, the first reactant in reaction chamber 12 and the second reactant in reservoir 14 or bladder 44 should not have the same composition. More preferably, hydrogen bearing fuel and the agent are in separate chambers. That is, if the first reactant in reaction chamber 12 includes the hydrogen bearing fuel, then it is preferable to have the agent as the second reactant in reservoir 14.

The hydrogen bearing fuel of the present invention can be any fuel capable of producing a gas, such as hydrogen, when reacted with an agent/composition, and/or placed under certain conditions. In some exemplary embodiments, the hydrogen bearing fuel can include a metal hydroxide. In some exemplary embodiments, the fuel can include, but is not limited to, hydrides of elements of Groups I-III of the Periodic Table of the Elements and mixtures thereof, such as, for example, alkaline or alkali metal hydrides, or mixtures thereof. Other compounds, such as alkali metal-aluminum hydrides (alanates) and alkali metal borohydrides may also be employed. For example, calcium hydride may be utilized as the solid fuel for such use in accordance with the invention. Preferably, the hydrogen bearing fuel includes $NaBH_4$, which can be in a solid state. However, aqueous $NaBH_4$ can also be utilized in the present invention. Preferably, when an aqueous form of $NaBH_4$ is utilized, the chamber containing the aqueous $NaBH_4$ also includes a stabilizer. Exemplary stabilizers can include, but are not limited to, metal hydroxides, such as, for example, alkali metal hydroxides. Most preferably, the stabilizer is NaOH.

In some exemplary embodiments, the first reactant, the second reactant, or both can include a catalyst that can facilitate the production of hydrogen gas by increasing the rate of reaction of the fuel source. The catalyst of the present invention can include any shape or size that is capable of promoting the desired reaction. For example, the catalyst can be small enough to form a powder or can be as large as the reservoir or the reaction chamber. In some exemplary embodiments, the catalyst is a catalyst bed. The optional catalyst can be located inside the reaction chamber, inside the reservoir, inside the bladder, proximate to the reaction chamber, the reservoir, or the bladder, as long as at least one of either the first reactant or the second reactant comes into contact with the catalyst.

In some exemplary embodiments, the catalyst can include a ruthenium catalyst, a platinum catalyst, a nickel catalyst, or any other catalyst known to one skilled in the art. In some exemplary embodiments, catalysts having a metal from Group VIIIB of the Periodic Table of the Elements can be used. Preferably, the catalyst that can be used with gas-generating apparatus 40 of the present invention is $CoCl_2$.

Some exemplary fuels that can be used in the present invention are, but not limited to, methanol, borohydride, ammonia borane, and hydrazine. To make these exemplary fuels, the first precursor can be dimethyl dicarbonate, water, borane-containing polymer, carbonate, ammonia, azine, and/or hydrogen peroxide. Each of these fuels is described in detail in U.S. patent application Ser. No. 10/854,540, which is previously incorporated herein in its entirety.

In some exemplary embodiments, the agent capable of reacting with the fuel is water. Preferably, the first reactant of the present invention, which, preferably, is located in the reaction chamber, is $NaBH_4$ and the second reactant, which, preferably, is located in the reservoir or the bladder in the reservoir, is water.

In some exemplary embodiments, the optional additive, which can be in the reaction chamber, in the reservoir, and/or in the bladder, can be any composition that is capable of substantially preventing freezing of or reducing the freezing point of the first and/or second reactant. In some exemplary embodiments, the additive can be an anti-freezing agent. In some exemplary embodiments, the additive can be an alcohol-based composition. Preferably, the additive of the present invention is $CH_3OH$. However, as stated above, any additive capable of reducing the freezing point of the first and/or second reactant can be used.

The aqueous solution optionally includes an acid having a pH of from about 3-5. An example of an acid that is added to the aqueous solution is acetic acid. One purpose of the acid in the present invention is to allow a more constant reaction between the aqueous solution and the solid fuel by preventing the formation of a barrier at the entrance of the reaction chamber.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

We claim:

1. A gas-generating apparatus comprising:
   a reaction chamber;
   a reservoir comprising at least one reactant; and
   a flow control device connecting the reservoir to the reaction chamber, wherein said at least one reactant is transportable from the reservoir to the reaction chamber through said flow control device to react to form gas, and when the pressure of the reaction chamber exceeds a predetermined stopping pressure the flow control device prevents the transport of said at least one reactant; and
   wherein said at least one reactant is transported to the reaction chamber by capillary action; and wherein the flow control device comprises a wicking conduit removably attachable to a wicking member connected to the reaction chamber.

2. The gas-generating apparatus of claim 1, wherein the reaction chamber contains a first reactant.

3. The gas-generating apparatus of claim 2, wherein the wicking conduit comprises a first end in contact with said at least one reactant contained in the reservoir and a second end capable of contacting said wicking member to establish a flow path from the reservoir to the reaction chamber.

4. The gas-generating apparatus of claim 3, wherein at least a portion of the second end of the wicking conduit is biased toward contacting the wicking member.

5. The gas-generating apparatus of claim 3, further comprising a weight attachable proximate to the first end of the wicking conduit.

6. The gas-generating apparatus of claim 3, wherein when the pressure in the reaction chamber is about the predetermined stopping pressure or higher the pressure pushes the second end of the wicking conduit away from the wicking member in the reaction chamber to interrupt the flow path.

7. The gas-generating apparatus of claim 3, wherein the second end is supported by an impermeable member.

8. The gas-generating apparatus of claim 3, wherein the second end is enlarged.

9. A gas-generating apparatus comprising:
   a reaction chamber;
   a reservoir comprising at least one reactant; and
   a flow control device connecting the reservoir to the reaction chamber, wherein said at least one reactant is transportable from the reservoir to the reaction chamber through said flow control device to react to form gas, and when the pressure of the reaction chamber exceeds a predetermined stopping pressure the flow control device prevents the transport of said at least one reactant;
   wherein said at least one reactant is stored in a bladder.

10. The gas-generating apparatus of claim 9, wherein the bladder is pressurized by a biasing member.

11. The gas-generating apparatus of claim 9, wherein the flow control device comprises a first valve adapted to open when the pressure in the reservoir is higher than the pressure in the reaction chamber to transport the reactant from the reservoir to the reaction chamber.

12. The gas-generating apparatus of claim 11, wherein said first valve closes when the pressure in the reaction chamber is within a predetermined difference less than the pressure in the reservoir.

13. The gas-generating apparatus of claim 12, wherein the predetermined stopping pressure is substantially the same as the pressure of the reservoir less the predetermined difference.

14. The gas-generating apparatus of claim 13, wherein the predetermined difference is less than about 2 psi.

15. The gas-generating apparatus of claim 13, wherein the predetermined difference is less than about 5 psi.

16. A gas-generating apparatus comprising:
   a reaction chamber;
   a reservoir comprising at least one reactant; and
   a flow control device connecting the reservoir to the reaction chamber, wherein said at least one reactant is transportable from the reservoir to the reaction chamber through said flow control device to react to form gas, and when the pressure of the reaction chamber exceeds a predetermined stopping pressure the flow control device prevents the transport of said at least one reactant;

wherein the flow control device comprises a diaphragm adapted to open when the pressure in the reservoir is higher than the pressure in the reaction chamber to transport the reactant from the reservoir to the reaction chamber, and wherein the diaphragm is biased by at least one biasing member.

17. The gas-generating apparatus of claim 16, wherein said diaphragm closes when the pressure in the reaction chamber is within a predetermined difference less than the pressure in the reservoir.

18. The gas-generating apparatus of claim 16, further comprising a sealing member operatively connected to the diaphragm to seal a flow path connecting the reservoir to the reaction chamber.

19. The gas-generating apparatus of claim 18, further comprising a rod that connects the diaphragm to the sealing member.

20. The gas-generating apparatus of claim 18, wherein the flow path is non-linear.

21. The gas-generating apparatus of claim 18, wherein the flow path is linear.

22. The gas-generating apparatus of claim 18, wherein the flow control device comprises an adjuster for the at least one biasing member.

23. A gas-generating apparatus comprising:
a reaction chamber;
a reservoir comprising at least one reactant; and
a flow control device connecting the reservoir to the reaction chamber, wherein said at least one reactant is transportable from the reservoir to the reaction chamber through said flow control device to react to form gas, and when the pressure of the reaction chamber exceeds a predetermined stopping pressure the flow control device prevents the transport of said at least one reactant; and further comprising a starter to initiate gas generation.

24. The gas-generating apparatus of claim 23, wherein the starter starts or stops introducing the at least one reactant from the reservoir to the reaction chamber by a push, pull, or rotational movement.

25. The gas-generating apparatus of claim 24, wherein the starter comprises a shaft and a valve rotatably connected to the shaft, wherein a rotational movement of the valve reciprocates the valve linearly.

26. A gas-generating apparatus comprising:
a reaction chamber;
a reservoir comprising at least one reactant; and
a flow control device connecting the reservoir to the reaction chamber, wherein said at least one reactant is transportable from the reservoir to the reaction chamber though said flow control device to react to form gas, and when the pressure of the reaction chamber exceeds a predetermined stopping pressure the flow control device prevents the transport of said at least one reactant;

wherein the flow control device comprises a movable member shuttling between a first position allowing the reactant to be transported from the reservoir to the reaction chamber and a second position allowing the produced gas to be transported from the reaction chamber.

27. The gas-generating apparatus of claim 26, wherein the movable member is biased towards the first position.

28. The gas-generating apparatus of claim 27, wherein the produced gas pushes the movable member to the second position.

29. The gas-generating apparatus of claim 26, further comprising corresponding valves to transport the reactant.

30. The gas-generating apparatus of claim 26, further comprising corresponding valves to transport the produced gas.

31. The gas-generating apparatus of claim 26, wherein the reservoir is pressurized.

32. A gas-generating apparatus comprising:
a reaction chamber;
a reservoir comprising at least one reactant; and
a flow control device connecting the reservoir to the reaction chamber, wherein said at least one reactant is transportable from the reservoir to the reaction chamber through said flow control device to react to form gas, and when the pressure of the reaction chamber exceeds a predetermined stopping pressure the flow control device prevents the transport of said at least one reactant; and further comprising a shut-off valve to release the produced gas.

33. The gas-generating apparatus of claim 32, wherein the shut-off valve cycles from a closed position to an open position to maintain the production of gas.

34. A gas-generating apparatus comprising:
a reaction chamber;
a reservoir comprising at least one reactant; and
a flow control device connecting the reservoir to the reaction chamber, wherein said at least one reactant is transportable from the reservoir to the reaction chamber through said flow control device to react to form gas, and when the pressure of the reaction chamber exceeds a predetermined stopping pressure the flow control device prevents the transport of said at least one reactant;
wherein the reservoir is removably connected to the reaction chamber.

35. The gas-generating apparatus of claim 34, wherein the reservoir comprises a first valve component adapted to connect the reservoir to the reaction chamber.

36. The gas-generating apparatus of claim 35, wherein the reaction chamber comprises a second valve component connectable to the first valve component.

37. A gas-generating apparatus comprising:
a reaction chamber;
a reservoir comprising at least one reactant; and
a flow control device connecting the reservoir to the reaction chamber, wherein said at least one reactant is transportable from the reservoir to the reaction chamber through said flow control device to react to form gas, and when the pressure of the reaction chamber exceeds a predetermined stopping pressure the flow control device prevents the transport of said at least one reactant;
wherein the reservoir comprises an expanding substance.

38. The gas-generating apparatus of claim 37, wherein the expanding substance comprises a hydrocarbon, an alcohol or an expanding balloon.

39. A gas-generating apparatus comprising:
a reaction chamber;
a reservoir comprising at least one reactant; and
a flow control device connecting the reservoir to the reaction chamber, wherein said at least one reactant is transportable from the reservoir to the reaction chamber through said flow control device to react to form gas, and when the pressure of the reaction chamber exceeds a predetermined stopping pressure the flow control device prevents the transport of said at least one reactant;
wherein the reservoir is connected to a manual relief valve.

40. A gas-generating apparatus comprising:
a reaction chamber;
a reservoir comprising at least one reactant; and a flow control device connecting the reservoir to the reaction chamber, wherein said at least one reactant is transportable from the reservoir to the reaction chamber through said flow control device to react to form gas, and when the pressure of the reaction chamber exceeds a predetermined stopping pressure the flow control device prevents the transport of said at least one reactant;

wherein the reaction chamber is connected to a manual relief valve.

41. A gas-generating apparatus comprising:

a reaction chamber;

a reservoir comprising at least one reactant; and a flow control device connecting the reservoir to the reaction chamber, wherein said at least one reactant is transportable from the reservoir to the reaction chamber through said flow control device to react to form gas, and when the pressure of the reaction chamber exceeds a predetermined stopping pressure the flow control device prevents the transport of said at least one reactant;

wherein a baffle is positioned between the reservoir and reaction chamber, wherein the baffle allows gas to be transported from the reaction chamber to the reservoir.

42. The gas-generating apparatus of claim 41, wherein liquid cannot be transported from the reservoir to the reaction chamber.

43. The gas-generating apparatus of claim 41, wherein the baffle comprises a plurality of ribs, wherein the spacing between the ribs is uneven.

44. The gas-generating apparatus of claim 43, wherein the spacing between the ribs is decreasing in the direction from the reaction chamber to the reservoir.

45. The gas-generating apparatus of claim 43, wherein the ribs comprise a plurality of sets of ribs, wherein the spacing between the ribs in the sets are uneven.

46. The gas-generating apparatus of claim 45, wherein the spacing in the sets is decreasing in the direction from the reaction chamber to the reservoir.

* * * * *